United States Patent
Wieth et al.

(10) Patent No.: US 11,459,010 B2
(45) Date of Patent: Oct. 4, 2022

(54) MANUALLY MOVABLE SHOPPING TROLLEY

(71) Applicants: Franz Wieth, Puchheim (DE); Andreas Filosi, Puchheim (DE)

(72) Inventors: Franz Wieth, Puchheim (DE); Andreas Filosi, Puchheim (DE)

( * ) Notice: Subject to any disclaimer, the term of this patent is extended or adjusted under 35 U.S.C. 154(b) by 0 days.

(21) Appl. No.: 16/965,179

(22) PCT Filed: Jan. 29, 2019

(86) PCT No.: PCT/EP2019/052118
§ 371 (c)(1),
(2) Date: Nov. 6, 2020

(87) PCT Pub. No.: WO2019/145563
PCT Pub. Date: Aug. 1, 2019

(65) Prior Publication Data
US 2021/0053605 A1 Feb. 25, 2021

(30) Foreign Application Priority Data
Jan. 29, 2018 (DE) .......................... 10 2018 000 657

(51) Int. Cl.
*B62B 5/06* (2006.01)
*B62B 3/14* (2006.01)

(52) U.S. Cl.
CPC ................ *B62B 5/069* (2013.01); *B62B 3/14* (2013.01)

(58) Field of Classification Search
CPC .. B62B 5/069; B62B 5/06; B62B 3/14; B62B 3/18
See application file for complete search history.

(56) References Cited

U.S. PATENT DOCUMENTS

| 4,248,441 | A | 2/1981 | Joseph |
| 5,915,712 | A | 6/1999 | Stephenson et al. |
| 9,540,023 | B2 * | 1/2017 | Sonnendorfer ........... B62B 3/02 |
| 10,577,007 | B2 * | 3/2020 | Gasche ..................... B62B 5/06 |
| 11,046,346 | B2 * | 6/2021 | Gasche ..................... B62B 5/06 |

(Continued)

FOREIGN PATENT DOCUMENTS

| DE | 102006034048 A1 | 1/2008 |
| DE | 102006043522 B3 | 1/2008 |

(Continued)

*Primary Examiner* — John D Walters
(74) *Attorney, Agent, or Firm* — Laurence A. Greenberg; Werner H. Stemer; Ralph E. Locher

(57) ABSTRACT

A manually movable trolley contains a basket for receiving goods and a tube connected to the basket. The tube has a first tube section which is at a distance from the basket and extends substantially parallel to the rear side of the basket, the tube section forming a handlebar for the shopping trolley. Respective second tube sections border on both sides of the first tube section and in the second tube sections the pipe bends towards the shopping trolley. Third tube sections border on each second tube section, and in the third tube sections the tube extends in a straight line. Fourth tube sections border on each third tube section, and in the fourth tube sections the tube bends at least substantially downwards. The second tube sections contain a sleeve that partially surrounds the periphery of the tube, and the sleeve has a separate handle that projects upward from the handlebar.

12 Claims, 2 Drawing Sheets

(56) References Cited

U.S. PATENT DOCUMENTS

2003/0132614 A1  7/2003 Kreamer
2013/0305486 A1* 11/2013 Sonnendorfer ....... B62B 3/1416
                                               16/111.1

FOREIGN PATENT DOCUMENTS

| DE | 202010013748 U1 | 1/2012 |
| DE | 102016102739 A1 | 8/2017 |
| EP | 0985200 B1 | 1/2002 |
| GB | 2502524 A | 12/2013 |
| WO | 2012042033 A1 | 4/2012 |

* cited by examiner

MANUALLY MOVABLE SHOPPING TROLLEY

BACKGROUND OF THE INVENTION

FIELD OF THE INVENTION

The invention relates to a manually shopping trolley, comprising a basket for receiving goods and a tube connected to the basket, the tube comprising a first tube section, which is at a distance from the basket and extends at least substantially parallel to the rear side of the basket, said tube section forming a handlebar for the shopping trolley, wherein a respective second tube section borders on both sides of the first tube section and, in the said second tube section, the tube is bent toward the shopping trolley, wherein a third tube section borders on the second tube sections respectively, and, in the said third tube section, the tube extends in a straight line, and wherein a fourth tube section borders on the third tube sections respectively, and, in the said fourth tube section, the tube is bent at least substantially downward. Furthermore, the invention relates to.

Manually movable transport trolleys are particularly used as so-called shopping trolleys in wholesale and retail trade. Depending on the application, they comprise different shapes and sizes. Transport trolleys for small to medium-sized goods in retail trade are usually basket-shaped. In one variant, they have two handle support arms projecting on the end side, between which a transverse handlebar is attached. A typical embodiment, especially in the USA, comprises a metal tube, which forms the handlebar at the rear of the shopping trolley and progresses in a bending manner away from this on both sides up to the chassis of the shopping trolley, on which rollers are attached and even partially form the chassis itself. Downward, in terms of this application, thereby means in the direction of the chassis.

In the middle of the handlebar, a lightly loaded shopping trolley can be easily pushed through the aisles of a shop with one hand. When the shopping trolley is filled, the handlebar is usually gripped using both hands. This allows for better power transmission, and, above all, a controlled change of direction of the now heavy shopping trolley by pushing and pulling on the handlebar in the opposite direction. A disadvantage of such handlebars is that the hands must always be turned laterally, contrary to their natural position, in order to be able to cover the handle running transversely.

A particular disadvantage of the usual shopping trolleys in the USA is that only their front wheels are designed to be steerable. Their rear rollers, which are closer to the handlebar, are firmly anchored, which means that turning the shopping trolley requires a higher effort due to the long lever due to the distance to the front rollers.

Transport trolleys for heavy and bulky goods, such as those found in a construction or wholesale market for example, usually have a flat loading region that is open on the side and handle support arms projecting upward on the outside of the transport trolley, at the upper end of which vertically orientated handles are attached. Such upward-projecting handles, ideally angled toward the user, are adapted to a person's natural posture, and make it easier for him/her to even move transport trolleys that are heavily loaded. When gasping these handles, the arm skeleton assumes a position in which the force of the upper arm muscles can be efficiently converted into a sliding or pulling movement of the hands. Such a transport trolley is shown in DE 10 2006 043 522 A1.

Furthermore, shopping trolleys are known, which take advantage of both grip shapes. They connect two vertically orientated grip sections that are angled toward the user with a transverse tube-shaped sliding handle. Such a transport trolley is known, for example, from DE 10 2006 034 048 A1.

These constructions are limited in several ways. On the one hand, it must always be noted that the position of the sliding handle and the sliding rod does not hinder the pushing together of the shopping trolleys so that they must always be arranged above or offset to the shopping trolley following in the row. The height of the vertical handles and the handlebar shall be designed in such a way that the average large user can comfortably grip both the vertical handle as well as the transversely running handlebar. In addition, the vertical handle should be sufficiently long so that it can be grasped with the whole hand. Only then is an ergonomic sliding position possible. A vertically orientated handle should thus always form the highest point of the handle construction.

SUMMARY OF THE INVENTION

It is the object of the invention to propose a manually movable shopping trolley, the steering of which is improved. Furthermore, it is the object of the invention to propose a retrofit kit suitable for improving steerability.

These tasks are achieved by means of a manually movable shopping trolley with the features of the first independent claim or by means of a sleeve with a separate handle according to the second independent claim. An essential basic idea of the invention is that the second tube section comprises a sleeve that partially surrounds the periphery of the tube, wherein the sleeve comprises a separate handle that projects upward from the handlebar. In this way, the customer is given an alternative gripping option to the handlebar, which allows for a much more ergonomic guidance of the shopping trolley. By connecting the two handles to the outside of the handlebar, they can develop a good leverage effect, which makes it easier to turn the shopping trolley.

Since the sleeve only partially surrounds the periphery of the tube, it can be easily put on the tube. Such a sleeve with a separate handle is therefore also suitable as a retrofit kit with which existing shopping trolleys can be improved. "Freestanding" in terms of this application means a handle which transmits a force acting on it exclusively to the tube via the sleeve.

By positioning the sleeve on the second section of the tube, the sleeve sits along a bend of the tube on it. The bend is at least approximately 90 degrees, since the two third tube sections usually run at least approximately parallel to each other. Viewed in the longitudinal direction, the sleeve thus has two ends that are orientated at least approximately at right angle to each other. Shaped in such a way, the sleeve can dissipate tensile or compressive forces acting on it into the tube well.

It is advantageous if the sleeve and the handle are connected to each other in a substance-to-substance manner. If the sleeve and handle are made of plastic, they can be formed in one as a moulded part. This makes it possible, for example, to produce them in one operation by injection moulding.

It is of particular advantage if the sleeve projects into the first and/or the third tube section, in particular, if it projects over more than half its length into the third tube section. By extending the sleeve in the region that runs at least approximately right angle to the opposite end of the sleeve, tensile or compressive forces acting on the sleeve can be discharged even better into the tube. The third, straight-running tube section is usually relatively short since the progression of the radii of the second and fourth tube section already help to shorten the distance between the handlebar and the basket. The length of the third tube section is often only 1-2 cm, so it is important in this region to make the best use of the available tube length.

In a preferred embodiment, the sleeve is at least substantially U-shaped, wherein the limbs on their opposite sides in the first and third tube section form an undercut for the tube. The undercut requires a bending of the two limbs by elastic deformation when the sleeve is put on the tube. The undercut on the tube then springs in and contributes to the attachment of the sleeve to the tube.

It is also advantageous if the two opposite limbs of the sleeve along the second tube section are distanced further away from each other than along the first and/or third tube section, in particular, that the limbs in the middle of the second tube section are distanced further away from each other than at the end regions of the second tube section bordering on the first or third tube section. In this way, a tolerance range is formed, which allows the sleeve to fit also on bend curves of the second tube section that deviate from the circular arc.

In a particularly preferred embodiment, the limbs in the first and the third tube section comprise opposite openings, wherein the openings are orientated transversely to the tube progression of the respective tube section and the connecting axle of which the tube does not intersect. This makes it possible to screw the two limbs together for better grip of the sleeve on the tube. The force induced by the screw ingestion tightens the two limbs on the tube. This also strengthens the positive-locking fit of the sleeve on the tube. The plastic, which is tensioned by the screw connection, relaxes after some time, but the reinforced positive-locking fit is retained. It is advantageous if the limbs are long enough that the screw can be passed under the tube. Then the surface of the tube can remain intact.

It is advantageous if one of the opposite openings is designed to secure the profile of a nut against turning by means of a positive-locking fit. Similarly, it is advantageous if one of the opposite openings comprises a narrowing, on which the side edge of a nut can rest. Shaped in such a way, the nut does not have to be held when tightening the screw and does not project at the limb of its end position.

Advantageously, the undercut is formed by a material reinforcement of the limbs and the openings are formed in the region of the material reinforcement. The increased thickness of the material stabilizes the limbs and provides additional depth to the openings for the screw and its nut.

It is also advantageous if the sleeve is sealed with a cover after snapping over the handle tube from below. In this way, the customer does not have to bridge any empty space when he/she is grasping the sleeve in this region. A function of the cover is thus a higher sliding comfort without disturbing edges in the region of the hands.

The cover can be attached to the sleeve particularly easily by inserting at least one of the screws provided for holding the sleeve on the tube under the handle tube by means of a holder designated for this purpose in the cover, thereby holding the cover on the sleeve.

For the benefit of the most ergonomic design possible, the longitudinal axis of the handle is engaged in a preferred embodiment at an angle between 70 and 98 degrees to the first tube section. Such an inclination of the handles is particularly pleasant for the user of the shopping trolley to grasp.

In the natural resting position of the arms, the palms are slightly angled toward the longitudinal axis of the body.

The adjacent region of the palm of the palm is located closer to the longitudinal axis than the region adjacent to the small finger. This natural position of the hands corresponds if the grip parts deviate from the vertical to a certain extent by the ends (having been removed from the fastening axle) being angled toward each other. It is therefore advantageous if an end of the handle facing away from the tube arranged on the one sleeve is angled in the direction of the other handle arranged at the other end of the tube section on the second sleeve.

Of course, the handles do not have to be straight, but can take a curved progression along their longitudinal axis for further ergonomic optimization.

It is particularly advantageous if the handles comprise a recess for the thumb. Handles designed in such a way can be handled with particular ease. When determining the sliding position, it should be noted that it is most convenient for the person who grasps the handle, if the handle is slightly angled away from it.

The ergonomic shape and positioning is not only noticeable when the shopping trolley is pushed evenly, when the triceps muscle is mainly used, or when pulling the shopping trolley with the biceps muscle. In particular, when going along a curve or even more so when maneuvering around the vertical axis of the transport trolley, the user, who is grasping the handle parts, pushes the handle with one arm and pulls with the other arm. Accordingly, in one arm, strain is put on the biceps muscle and, in the other arm, strain is put the triceps muscle.

The handles formed according to the invention thus facilitate in particular weaker persons the maneuvering of heavier shopping trolleys. The advantageous effect of the position of the handles according to the invention is all the more noticeable the weaker the pushing person is and the heavier the shopping trolley is.

Favourably, in the region of the sliding rod and/or the handle part and/or the fastening element electrically conductive elements are present, which are connected to the tube of the shopping trolley. The advantage arises from the fact that the metal parts of the shopping trolley, which basically exhibit the behaviour of a capacitor, can be grounded. The grounding is carried out by the user standing on the ground via the conductive elements to the metal parts of the transport trolley, for example by a wire that connects the second tube section with the electrically conductive elements of the handle. As a result, the load generated by pushing the transport trolley cannot be stored in the metal parts.

Favourably, the cover of the sleeve is made of electrically conductive plastic. Since the cover is a separate part that is only connected to the sleeve during assembly, electrically conductive plastic can be dispensed with at least for the most part during the production of the sleeve. This means that the sleeve can be produced more cost-effectively.

The invention is explained in more detail by the hand of an exemplary embodiment.

DETAILED DESCRIPTION OF THE INVENTION

Figure 1:
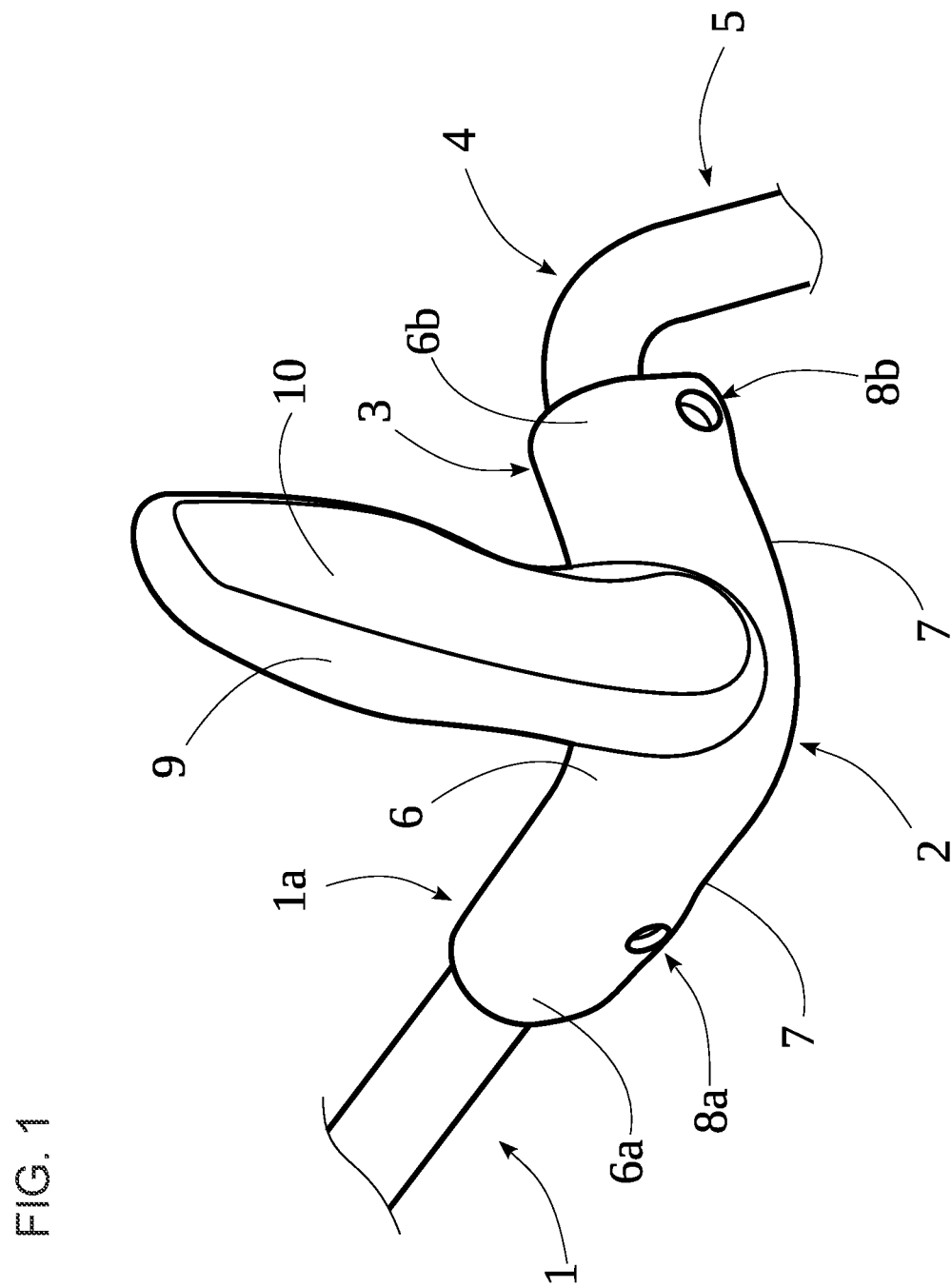
FIG. 1: A section of the tube progression with attached sleeve.

The progression of a section of the tube shown in FIG. 1 as an example comprises a part of a first tube section 1, passing into the second tube section 2, the third tube section 3 bordering on it and the fourth tube section 4 adjoining the third tube section 3. The fourth tube section 4 passes into a fifth tube section 5, which runs in the direction of the chassis or the lower frame of the shopping trolley (not shown here).

A tube sleeve 6 partially comprising the tube is placed along the entire progression of the second tube section 2 on this and projects with its one end region 6a into an edge region 1a of the first tube section. It projects into the third tube section 3 with its other end region 6b. In the exemplary embodiment shown here, the end region 6b projects into the third tube section 3 to such an extent that it at least nearly fully covers the third tube section 3. This achieves maximum stability. In the case of first end region 6a, a covering of the edge region 1a at the length of 2 cm is sufficient for the desired stability, a length of 3-4 cm is particularly suitable.

At its underside, the completely U-shaped sleeve 6 forms two limbs, of which the outer limb 7 in the curved progression of the second tube section 2 is visible. In the end regions 6a or 6b of the sleeve 6, the limb 7 comprises an opening 8a or 8b, into which a screw for connecting to a nut held in the opposite limb (not shown) of the sleeve 6 can be used.

Starting from the outer limb 7, a separate handle 9 projects upward from the sleeve 6. The separate handle 9 comprises an inlay 10 arranged in the handle region of the handle 9, which is electrically conductive.

Figure 2:
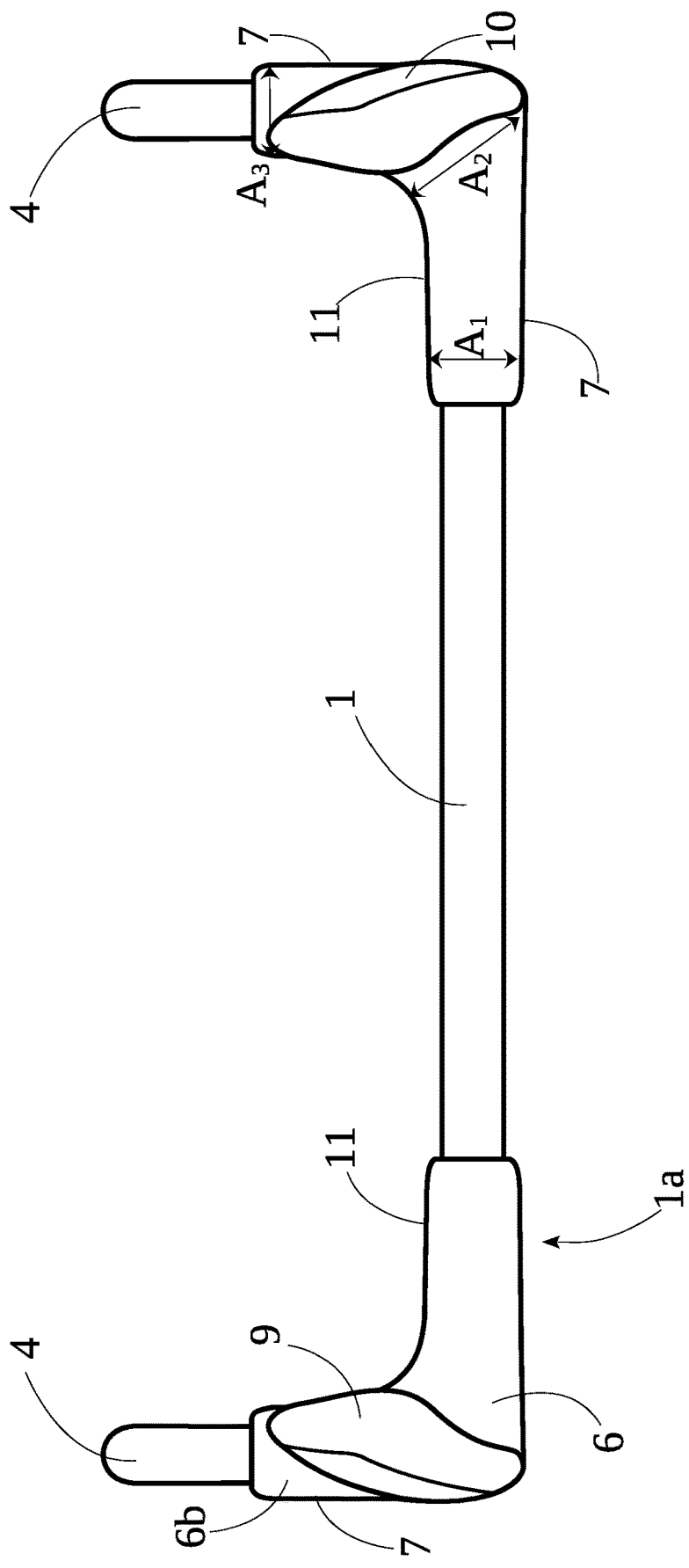
FIG. 2: A further section of the tube progression with sleeves attached to the handlebar on both sides in accordance with FIG. 1.

FIG. 2 shows two sleeves 6 placed in accordance with FIG. 1 in a view from above. Handles 9 are angled toward each other. It is recognizable that the distance between the limbs 7, 11 of the sleeve 6 in the region of the second tube section is further $A_2$ than the distance in the regions of the first $A_1$ and third $A_3$ tube section. An illustration of the tube section 5 was done without.

The invention claimed is:

1. A manually movable shopping trolley, comprising:
   a basket for receiving goods and having a rear side; and
   a tube connected to said basket, said tube including
   a first tube section, being at a distance from said basket and extending at least substantially parallel to said rear side of said basket, said first tube section forming a handlebar for the manually movable shopping trolley,
   second tube sections with a respective second tube section bordering on both sides of said first tube section and, in said respective second tube section, said tube is bent toward the manually movable shopping trolley,
   third tube sections with a third tube section bordering on each of said second tube sections respectively, and, in said third tube section, said tube extending in a straight line, and
   fourth tube sections with a fourth tube section bordering on each of said third tube sections respectively, and, in said fourth tube section, said tube is bent at least substantially downward,
   said respective second tube section having a sleeve partially surrounding a periphery of said tube, wherein said sleeve having a separate handle projecting upward from said handlebar.

2. The manually movable shopping trolley according to claim 1, wherein said sleeve and said separate handle are fixedly bonded to each other.

3. The manually movable shopping trolley according to claim 1, wherein said sleeve projects into at least one of said first tube section or said third tube section.

4. The manually movable shopping trolley according to claim 1, wherein said sleeve is at least substantially U-shaped with two opposite limbs, said limbs on their opposite sides in said first tube section and said third tube section form an undercut for said tube.

5. The manually movable shopping trolley according to claim 4, wherein said two opposite limbs of said sleeve along said respective second tube section are distanced further away from each other than along said first tube section and/or said third tube section.

6. The manually movable shopping trolley according to claim 5, wherein said limbs in a middle of said respective second tube section are distanced further away from each other than at end regions of said respective second tube section bordering on said first tube section or said third tube section.

7. The manually movable shopping trolley according to claim 4, wherein said limbs in said first tube section and said third tube section have opposite openings formed therein, wherein said opposite openings are orientated transversely to a tube progression of a respective tube section and whose connecting axle does not intersect said tube.

8. The manually movable shopping trolley according to claim 7, wherein said undercut is formed by a material reinforcement of said limbs and that said openings are formed in a region of said material reinforcement.

9. The manually movable shopping trolley according to claim 1, wherein said separate handle has a surface which at least partially contains an electrically conductive plastic.

10. The manually movable shopping trolley according to claim 1, wherein said separate handle has an end facing away from said tube disposed at one said sleeve and is angled in a direction of another said separate handle disposed at another end of said first tube section at a second said sleeve.

11. The manually movable shopping trolley according to claim 1, wherein said sleeve projects into said first tube section and/or into said third tube section, namely said sleeve projects into said third tube section by over more than half its length.

12. A sleeve, comprising:
   a sleeve body having two ends, said sleeve body being configured to be removably connected to a handlebar of a manually movable shopping trolley, and said sleeve body being configured to partially surround a periphery of the handlebar of the manually movable shopping trolley when connected;
   said sleeve body having a bend wherein said two ends are arranged at substantially 90 degrees to each other; and
   a separate handle projecting upward from said sleeve body; and the sleeve functioning as a retrofit kit for the manually movable shopping trolley.

* * * * *